United States Patent [19]

Natali

[11] 3,772,600

[45] Nov. 13, 1973

[54] DIGITAL BIT SYNCHRONIZER

[75] Inventor: Francis D. Natali, San Francisco, Calif.

[73] Assignee: The United States of America as represented by the Secretary of the Air Force

[22] Filed: July 14, 1972

[21] Appl. No.: 271,945

[52] U.S. Cl. .............. 328/63, 178/69.5 R, 307/269, 328/72, 328/133, 328/155

[51] Int. Cl. .......................... H03k 1/00, H03k 5/00

[58] Field of Search ............................ 307/208, 269; 328/63, 72, 133, 155; 178/69.5 R

[56] References Cited

UNITED STATES PATENTS

| | | | |
|---|---|---|---|
| 3,333,205 | 7/1967 | Featherston | 328/63 |
| 3,439,279 | 4/1969 | Guanella | 328/63 |
| 3,510,786 | 5/1970 | Paulson | 328/155 |
| 3,544,907 | 12/1970 | Bleickardt | 328/63 |
| 3,566,155 | 2/1971 | Demaio et al. | 307/269 X |
| 3,646,452 | 2/1972 | Horowitz et al. | 328/63 |

*Primary Examiner*—Stanley D. Miller, Jr.
*Attorney*—Harry A. Herbert, Jr. et al.

[57] ABSTRACT

A system for deriving synchronizing pulses from a train of digital signals that is fed to in-phase and mid-phase gates each including an adder with a delay feedback. The output of the mid-phase gate is multiplied by a sign factor determined by a logic circuit connected to the in-phase gate. The output of the two gates are then mixed, filtered, and summed with a value dependent upon the clock rate and fed to a number controlled oscillator which includes a counter and a comparing circuit. The output of the number controlled oscillator is fed back to the in-phase and mid-phase gates.

2 Claims, 8 Drawing Figures

DIGITAL BIT SYNCHRONIZER

BACKGROUND OF THE INVENTION

This invention relates to timing synchronizing and more particularly to a system deriving bit synchronization from digital samples.

In electronic systems using digital data detectors there is a need for obtaining bit synchronization usually derived from the received signal. The present invention presents a novel and improved system for obtaining the necessary bit synchronization from a sequence of digital samples taken from binary synchronization usually derived from the received signal. The present invention presents a novel and improved system for obtaining the necessary bit synchronization from a sequence of digital samples taken from binary waveforms.

SUMMARY OF THE INVENTION

The digital bit synchronizer is basically a digital phase lock loop which is capable of tracking samples of a binary waveform. Since transitions may or may not occur between adjacent bits, a nonlinear operation is required in the phase detector to insure the output has the proper sign.

It is an object of this invention to provide a novel and improved system for synchronizing bits from a train of digital samples.

It is another object to provide a synchronizer in the form of a digital phase-locked loop which is capable of tracking samples of a binary data waveform.

It is yet another object to provide a system for synchronizing bits of a binary waveform where transitions may occur between adjacent bits.

These and other objects, features and advantages of the invention will become more apparent from the following description taken in connection with the illustrative embodiments in the accompanying drawings.

DETAILED DESCRIPTION OF THE PREFERRED EMBODIMENTS

Figure 1A:
FIGS. 1*a* through 1*c* are waveform diagrams showing the derivation of bit synchronizing pulses derived from a data impulse wave.
Figure 1B:
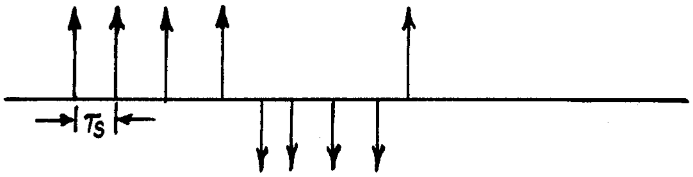
Figure 1C:

Digital data detectors generally require some type of bit synchronization usually derived from the received signals. The present invention has the capability of deriving bits from a sequence of digital samples taken from a binary waveform such as that shown in FIG. 1*a* which is a basic data waveform having a pulsewidth of T. Samples are taken as shown in FIG. 1*b*, the samples being represented by arrows with the time difference between samples being shown as $T_s$. The bit synchronization pulses are then derived and are shown in FIG. 1c as vertical lines.

In order to illustrate a means of obtaining a measure of the phase error, consider the set of samples $S_1, S_2, \ldots S_8$ from one bit and $S_9, S_{10}, \ldots S_{16}$ from the previous bit where $S_1$ is the most recent sample.

A means of generating the phase error signal is as follows. The phase error signal is generated by a mid-phase (MP) gate which performs the summation, $$S_{MP} = \sum_{i=5}^{12} S_1$$

an in-phase (IP) gate forms the sums $$S_{IP}(n) = \sum_{i=1}^{8} S_i$$

and $$S_{IP}(n-1) = \sum_{i=9}^{16} S_i$$

The output of the mid-phase gate is then multiplied by +1, 0, or −1, based on the following logic rules:

$S_{IP}(n-1) > 0$, $S_{IP}(n) < 0$; multiply by +1 (opposite signs)

$S_{IP}(n-1) < 0$, $S_{IP}(n) > 0$; multiply by −1 (opposite signs)

$S_{IP}(n-1)$ and $S_{IP}(n)$ are the same sign; multiply by 0.

Figure 2:
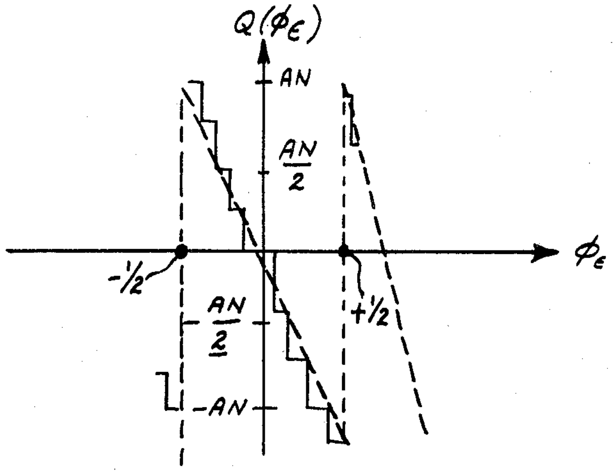
FIG. 2 is an input/output detector characteristic curve of the digital bit synchronizer.

The resulting phase error detector characteristic is shown in FIG. 2 where A represents the signal amplitude, N the number of samples in the mid-phase gate, 2A the step height, and 1/N the step width.

Figure 4:
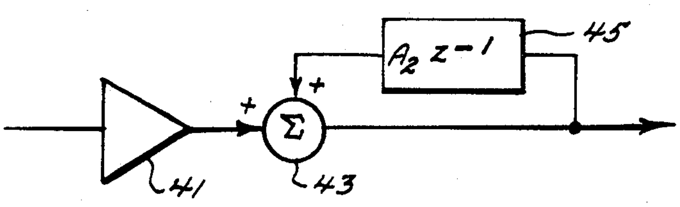
FIG. 4 is a block diagram of the loop filter used in the embodiment of FIG. 3.
Figure 3:
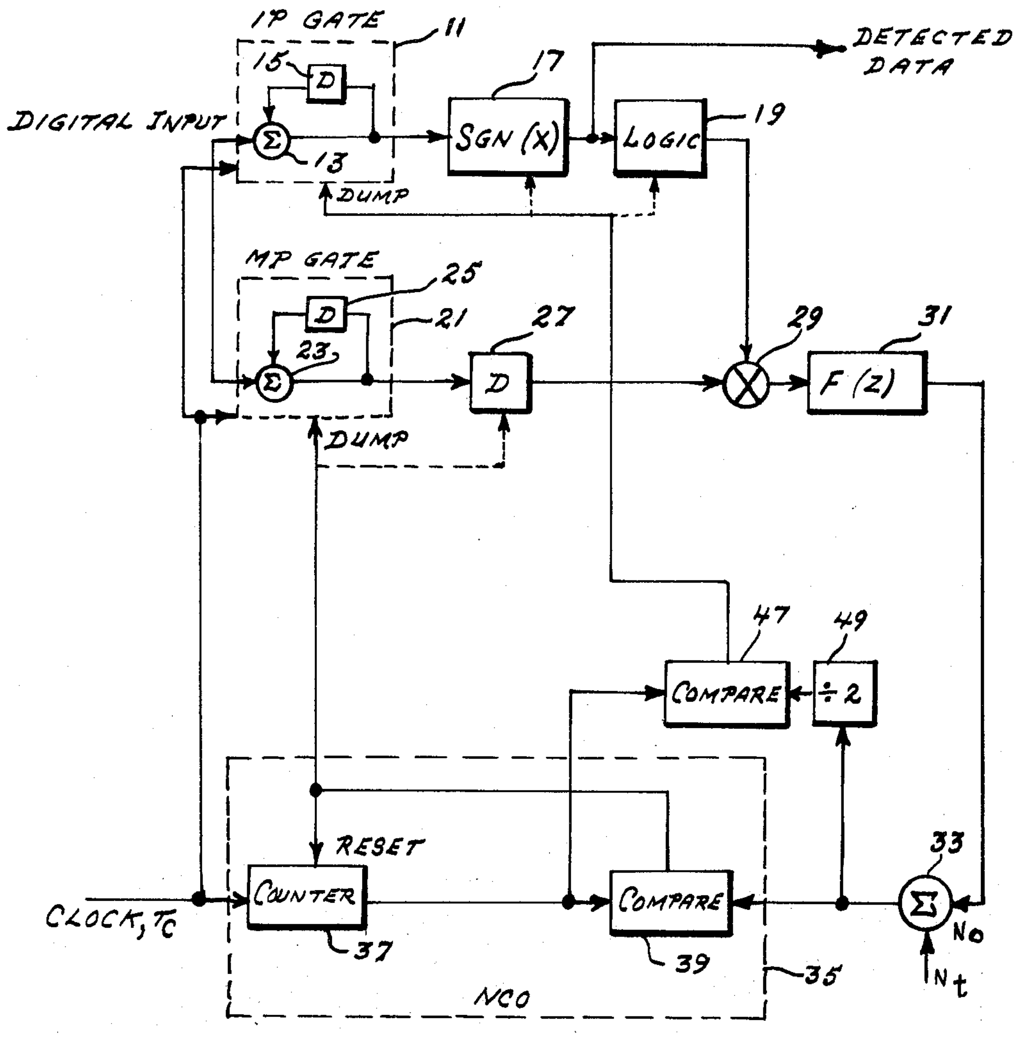
FIG. 3 is a block diagram showing an embodiment of the invention.

A block diagram of the digital bit synchronizer employing the in-phase and mid-phase (IP/MP) detectors is shown in FIG. 3. The digital input signal is fed to in-phase gate 11 together with the clock pulses. Gate 11 includes summing circuit 13 and feedback delay 15. The sign is determined by circuit 17 and then fed to logic circuit 19 where the logic previously explained is performed. The digital input data and clock pulses are also fed to mid-phase gate 21 including summing circuit 23 and feed-back delay 25. The output of mid-phase gate 21 is fed to delay circuit 27 and is then mixed in mixer 29 with the output of logic circuit 19. The output of mixer 29 is a phase error signal and is smoothed in loop filter 31. This filter is shown as FIG. 4 and includes amplifier 41 fed by the phase error signal and summer 43 having feedback loop 45. The output of filter 41 designated as $N_o$ is fed to summing circuit 33 which is also fed by a value equal to $N_t = T/T_c$, where T = time length of the sample and $T_c$ = pulse period of the clock. The $N_o$ value is such that the digital bit synchronizer operates at the data rate where there is no error number present. The $N_o$ signal shrinks the gate size until the phase lock is achieved, i.e., the phase error is zero. The output of summer 33 is fed to number control oscillator (NCO) 35 which includes comparing circuit 39 and counter 37. This circuit is a divide-by-N circuit where N is a variable and programmable. Mid-phase gate timing is obtained by generating a pulse when the counter reaches half of its total count.

In practice, it may be desired to have the NCO to count a considerably higher rate than the sampling rate to achieve smaller increments between NCO frequencies. It is assumed that this is the case and that the NCO counts some multiple of the sampling rate.

It can be shown that the noise power into the loop filter is directly proportional to the length of the mid-phase gate and that it is advantageous to use an integration time of one half bit or less. It is noted that the shorter gate allows a constant integration time to be used in the mid-phase channel.

One output from number control oscillator 35 is fed to comparing circuit 47 and is compared with the sum from summer 33 after division by divide-by-2 circuit 49. Comparing circuit 47 then controls in-phase gate 11 while comparing circuit 39 controls mid-phase gate 25.

As an example of the rate of operation, the bit synchronizer was designed and built for operation at a data rate of 19.2 kbps with 20 samples per bit, each sample quantized to a maximum of 5 bits. The synchronizer counts a basic frequency of 300 times the bit rate (5.76 MHz) thus allowing the small changes in phase required for narrow noise bandwidths. The mid-phase gate is eight samples wide (out of 20). The loop filter is a constant gain which results in a first order loop.

Figure 5:
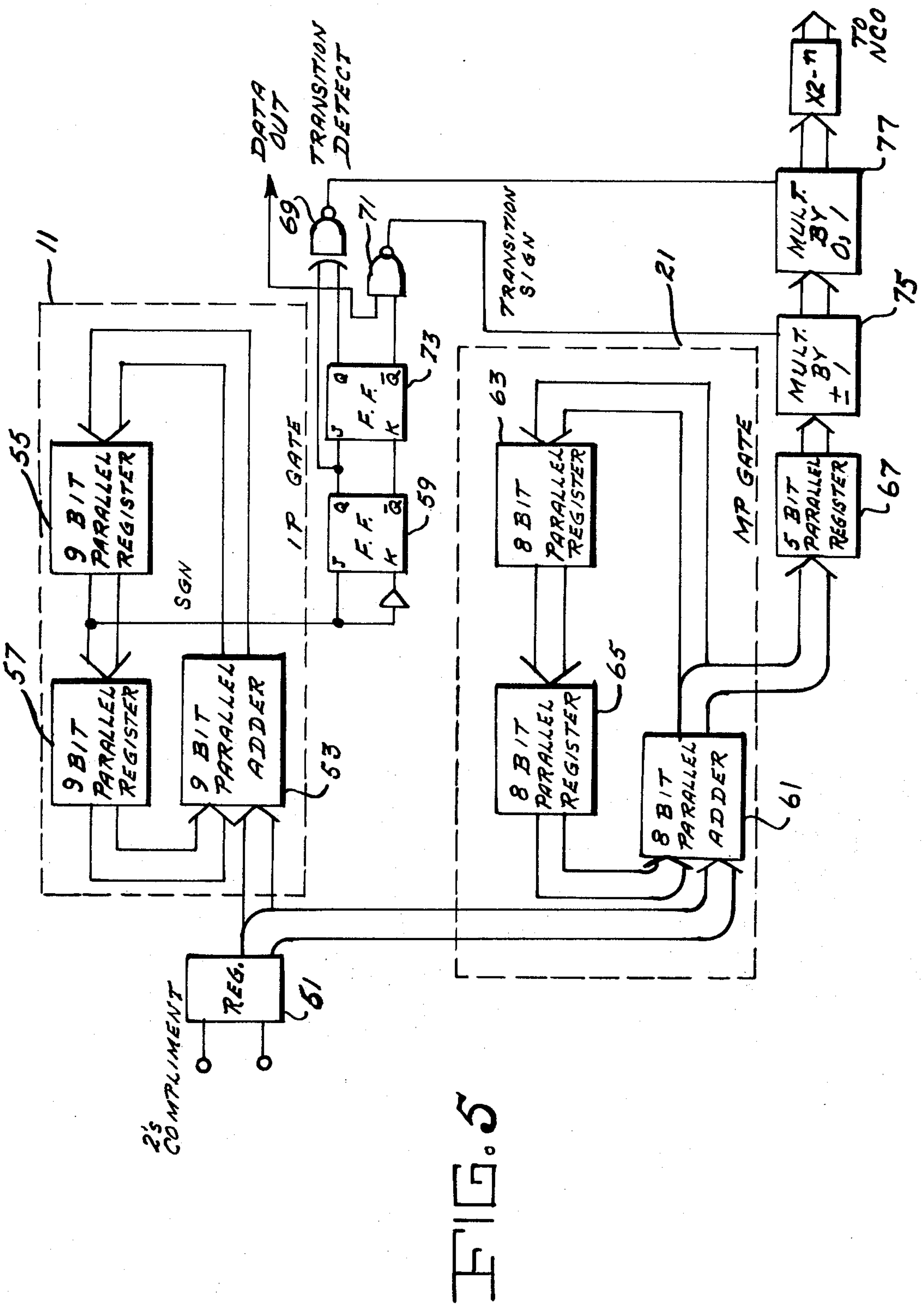
FIG. 5 is a block diagram showing the details of the in-phase and mid-phase detectors and associated logic used in the embodiment of FIG. 3.

IP/MP gates and associated logic circuits are shown in FIG. 5 as parallel digital accumulators. The inputs to these gates consist of five bits samples coded in twos complement by register 51. The IP accumulator or adder 53 carries nine bits and is fed back through registers 55 and 57. The data output is the sign bit at the end of the integration period through flip-flop 59. mid-phase gate 21 uses eight bit adder 61 and is fed back through registers 63 and 65. It is dumped after the 16th sample and the output is stored after eight samples have been summed and stored in register 67. Multiplication by −1 consists of inverting the output and adding 1. This is done with inverting gates 69 and 71 through flip-flops 59 and 73 having complementary inputs and outputs and multiplying circuits 75 and 77.

Figure 6:
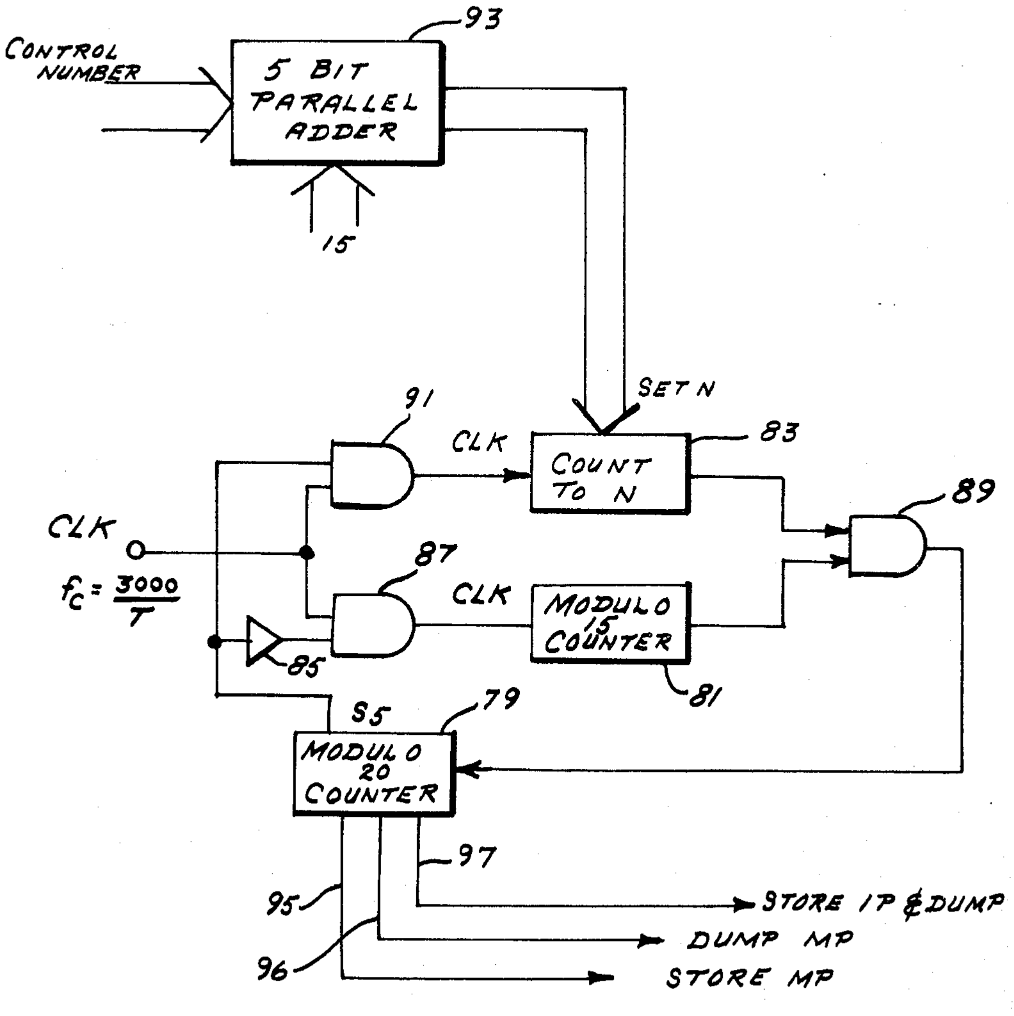
FIG. 6 is a block diagram of the number controlled oscillator used in the embodiment of FIG. 3.

The number controlled oscillator shown in FIG. 6 consists of fixed counters 79 and 81 and variable counter 83. Counter 81, a modulo 15 counter, counts pulses at a rate of 300/T pps. It receives clock pulses through amplifier 85 and gate 87. On the fifteenth count, counter 79, a modulo 20 counter, through gate 89 is advanced by one count. When counter 79 reaches the fifth state the clock line is switched via gate 91 to counter 83 which counts to $15 + N_o$, the error number out of the loop filter. This addition takes place in error adder 93. The clock line is switched back to counter 81. Lines 95, 96 and 97 are intermediate states of counter 79 used to control the in-phase and mid-phase gates.

The digital bit synchronizer can be built using standard TTL integrated circuits and other available hardware.

What is claimed is:

1. A system for deriving synchronizing pulses from a train of digital signals comprising:

a. a clock;

b. an in-phase gate the timing thereof being controlled by the clock including

1. a first adder fed by the train of digital signals, and

2. a first register connecting the output of the first adder to the input in a feedback loop;

c. a multiplying logic circuit fed by the in-phase gate, the multiplying factor being dependent upon the sum within the in-phase gate;

d. a mid-phase gate the timing thereof being controlled by the clock including

1. a second adder fed by the train of digital signals, and

2. a second register connecting the output of the second adder to the input in a feedback loop;

e. a mixer fed by the logic circuit and the mid-phase gate;

f. a filter fed by the mixer;

g. a summing circuit fed by the filter and a signal the value thereof being equal to the ratio of the time length of a digital signal to the pulse period of the clock;

h. a counter fed by the clock;

i. a first comparing circuit fed by the counter and the summing circuit, the output of the first comparing circuit being fed to the counter as a reset pulse; and j. a second comparing circuit fed by the counter and the summing circuit, the output of the second comparing circuit being fed to the multiplying logic circuit.

2. A system for deriving synchronizing pulses according to claim 1 wherein the multiplying logic circuit includes:

a. a first flip-flop having complementary inputs and outputs, the inputs being fed by the in-phase gate;

b. a second flip-flop fed by the complementary outputs of the first flip-flop;

c. a first inverting gate fed by one output of each of the first and second flip-flops; and d. a second inverting gate fed by the opposite outputs of the first and second flip-flops from that fed to the first inverting gate.

* * * * *